(12) United States Patent
Vogt et al.

(10) Patent No.: US 9,061,372 B2
(45) Date of Patent: Jun. 23, 2015

(54) MACHINING HEAD, LASER MACHINING TOOL, RECEIVING METHOD, MEASURING HEAD, MEASURING METHOD

(75) Inventors: Christian Vogt, Dietmannsried (DE); Waldemar Kargus, Pfronten (DE)

(73) Assignee: SAUER GMBH LASERTEC, Pfronten (DE)

( * ) Notice: Subject to any disclaimer, the term of this patent is extended or adjusted under 35 U.S.C. 154(b) by 901 days.

(21) Appl. No.: 12/991,152

(22) PCT Filed: May 4, 2009

(86) PCT No.: PCT/EP2009/003184
§ 371 (c)(1),
(2), (4) Date: Dec. 17, 2010

(87) PCT Pub. No.: WO2009/135632
PCT Pub. Date: Nov. 12, 2009

(65) Prior Publication Data
US 2011/0087362 A1    Apr. 14, 2011

(30) Foreign Application Priority Data

May 6, 2008    (DE) .......................... 10 2008 022 210

(51) Int. Cl.
*B23K 26/00*    (2014.01)
*B23K 26/14*    (2014.01)
(52) U.S. Cl.
CPC ......... *B23K 26/1482* (2013.01); *B23K 26/1417* (2013.01); *B23K 26/14* (2013.01)
(58) Field of Classification Search
USPC ................................ 219/121.6–121.86; 73/37
See application file for complete search history.

(56) References Cited

U.S. PATENT DOCUMENTS

| | | | | |
|---|---|---|---|---|
| 4,031,351 A | * | 6/1977 | Martin ...................... | 219/121.67 |
| 4,461,947 A | * | 7/1984 | Ward ........................ | 219/121.84 |
| 5,089,685 A | * | 2/1992 | Schmidt-Hebbel ...... | 219/121.83 |
| 5,203,204 A | * | 4/1993 | Miyazaki et al. .......... | 73/114.56 |
| 5,356,081 A | * | 10/1994 | Sellar ................................. | 241/1 |
| 2003/0041468 A1 | | 3/2003 | Matsutori | |
| 2005/0257603 A1 | | 11/2005 | Ohmi et al. | |

FOREIGN PATENT DOCUMENTS

| | | |
|---|---|---|
| DE | 30 29 474 A1 | 3/1982 |
| DE | 38 14 074 A1 | 11/1989 |
| EP | 1 364 756 A1 | 11/2003 |
| EP | 1 602 440 A1 | 12/2005 |

(Continued)

OTHER PUBLICATIONS

Japanese Office Action in corresponding application No. 2013-215762 mailed Feb. 10, 2015.

*Primary Examiner* — Sang Y Paik
(74) *Attorney, Agent, or Firm* — Ziegler IP Law Group, LLC

(57) ABSTRACT

A machining head of a laser machining tool includes a mechanical connector for connecting the machining head to a component of the laser machining tool, and a light path connector (15) and/or an electrical connector (16) and/or a fluid connector (17). The provided connectors are designed such that connections can be realized via one or more common relative movements between the machining head (10) and the component (5) of the laser machining tool, including a mechanically rigid connection to corresponding connectors on the component of the laser machining tool.

10 Claims, 8 Drawing Sheets

(56) References Cited

FOREIGN PATENT DOCUMENTS

| | | |
|---|---|---|
| JP | 01-142408 A | 6/1989 |
| JP | 03-199907 | 8/1991 |
| JP | 2001-349719 A | 12/2001 |
| JP | 2004-098093 A | 4/2004 |
| JP | 2004 098093 A | 4/2004 |
| JP | 2007-101473 A | 4/2007 |
| JP | 2007-319927 | 12/2007 |
| WO | 02/20215 A2 | 3/2002 |

\* cited by examiner

MACHINING HEAD, LASER MACHINING TOOL, RECEIVING METHOD, MEASURING HEAD, MEASURING METHOD

BACKGROUND

1. Field

The aspects of the disclosed embodiments relate to a machining head, a laser machining tool having such machining head, a receiving method, a measuring head, and a measuring method.

2. Brief Description of Related Developments

Laser machining tools are used for different purposes. On the one hand, they may be used for surface machining; on the other hand, they may also be used for voluminous workpiece machining. In the case of workpiece finishing, it is possible to produce accurately defined dies by mans of a laser beam by purposefully traveling individual layers. However, a laser beam may also be used to cut and/or drill holes and/or weld components.

The different types of usage require different laser machining heads. On the one hand, they may differ in their optical characteristics, for example, by having different optical modules that permit different optical influences and evaluations of the laser light passing the machining head. Laser machining also comprises a more or less complex sensor system, which is able, for example, to receive and evaluate the emitted laser light and optionally also the reflected laser light (light emitted by the process). Further optical and other sensors may be provided in a machining head. A machining head may also include optical actuator technology, for example an adjustable focusing device for changing the focus condition of the laser beam, optionally also during operation. A beam guide may also be provided for guiding the laser beam across the workpiece surface in a desired manner.

Furthermore, the machining heads of laser machining tools may have a fluid guide. Particular gases may, for example, be guided via the machining head to the present machining site, e.g. passivating gases such as nitrogen or an inert gas, or reactive gases such as oxygen, or the like.

When a machining head is changed, this is performed in a fashion that the head no longer required is manually removed and the newly required head is likewise manually connected to the rest of the system of the laser machining tool. To this end, the mechanical connection in particular, however, also the optical, electrical and optionally the fluid connections, are to be established.

FIG. 1 schematically shows a laser machining tool 1 to which the application may be applied. Reference numeral 2 generally denotes a housing comprising a mechanically rigid machine frame 2a and optionally a door 2b that may enclose a machining space 2c. 3 and 3a, 3b and 3c, respectively, denote components of a tool arm. 4 (4a, 4b, 4c) schematically symbolizes movement axles that allow the relative movement between the workpiece 9 and the machining head 10. The axles are driven axles and may comprise a plurality of translational axles and a plurality of rotational axles. Some axles may also be provided in duplicate. The movement axles may alternatively be provided between the workpiece table and the machine frame 2a or between the machine frame 2a and the machining head 10. One or more axles may be present in duplicate.

5 denotes the connector on the arm, to which a machining head 10 can be connected. As mentioned before, the connector comprises the necessary means for establishing the mechanical connection and optionally the electrical, optical and fluid connections. 6 generally denotes a supply means that provides the machine with electrical energy and control signals as well as with the laser light and optionally with the required gases. 6a refers to a control for sending and receiving signals. 6b refers to a laser unit for producing or forwarding laser light to the machining head 10. 6c refers to a fluid source, for example, a pressurized air source or the source of another gas (inert gas, nitrogen, oxygen, . . . ). These parameters (electrical energy, electric signals, laser light, fluids) are supplied via schematically shown conduits 8 from the supply unit 6 via the connector 5 to the laser head 10 so that the latter is provided for in a suitable manner.

Furthermore, the machine includes general sensor and actuator technologies and control components for controlling and operating the machine. Particularly, position sensors may be provided at the individual axles. The individual axles may be driven automatically, electrically or pneumatically. The controller may have a more complex calculator for carrying out complex control tasks.

So far, when a machining head is replaced, the mechanical connection is made manually by corresponding handling actions. Then, the electrical connections and the pneumatic connections are separately established, likewise by hand. The laser light connection may have been made at the same time as the mechanic connection because the mechanic connection frequently also establishes the laser light connection at the same time, particularly in the desired and necessary alignment.

It is a disadvantage of the previous method that the replacement of a machining head is cumbersome and time-consuming. Particularly in the case of machining operations that take a long time, it may be necessary to maintain staff that otherwise would not be required only for the purpose of changing a machining head.

It would be advantageous to provide a machining head and a laser machining tool that enable a simplified change of a machining head.

SUMMARY

A machining head according to one aspect of the disclosed embodiments includes a mechanical connector for connecting the machining head to the laser machining tool and furthermore a light path connector and/or an electrical connector and/or a fluid connector. The provided connectors are adapted such that by using them the necessary connections can be made via one or more common relative movements between the machining head as a whole and the laser machining tool, that is, in particular a mechanical connection having the desired or necessary rigidity and, moreover, in correspondence with the provided other connectors a light path connection and/or an electrical connection and/or a fluid connection.

The relative movement for establishing all of these connections is a common movement of the head components. Thus, it is not necessary to separately operate individual components of the head. It is not necessary either to perform any further operations by the laser machining tool and the component thereof, respectively, to which the connection is made. The connection is made via the common relative movement of the head component relative to the component of the machining tool to which the connection is made. The relative movement may comprise a translational movement and/or a rotational movement.

Accordingly, the machining head has a particular design and alignment of the connectors thereof. The machining tool has connectors that are designed and aligned in a diametrically opposed matching manner.

The change of the machining head may take place automatically in a manner that the machining arm approaches a magazine 7 of a machining tool in order to optionally first deposit a machining head 10 that is no longer required, and next the relative movements are performed which are necessary for detachment (and beforehand, possible unlocking) when the deposit position has been reached in the magazine. Then, a new machining head may be approached at another position in the magazine 7. A connection thereto is made by performing the necessary relative movements. Next, the machining head 10 can be removed from the magazine 7 and used for further machining.

Accordingly, aspects of the disclosed embodiments are the above-described machining head 10 with the particular design of the connectors thereof, a laser machining tool 1 with the design of the machine connector 5 diametrically opposed to the machining head 10, the overall system of machining head and machining tool and a machining head change method. The connector design may be regarded as an interface. The matching machining connectors at the machine and head constitute this interface between the machine and the head.

BRIEF DESCRIPTION OF THE DRAWINGS

Below, individual embodiments of the disclosure are described with reference to the drawings, wherein.

In the description same reference numerals denote the same components. Features of the invention are intended to be considered combinable with one another even if this is not explicitly mentioned, as far as the combination is not made impossible for technical reasons.

DETAILED DESCRIPTION OF THE DISCLOSED EMBODIMENTS

Figure 2:
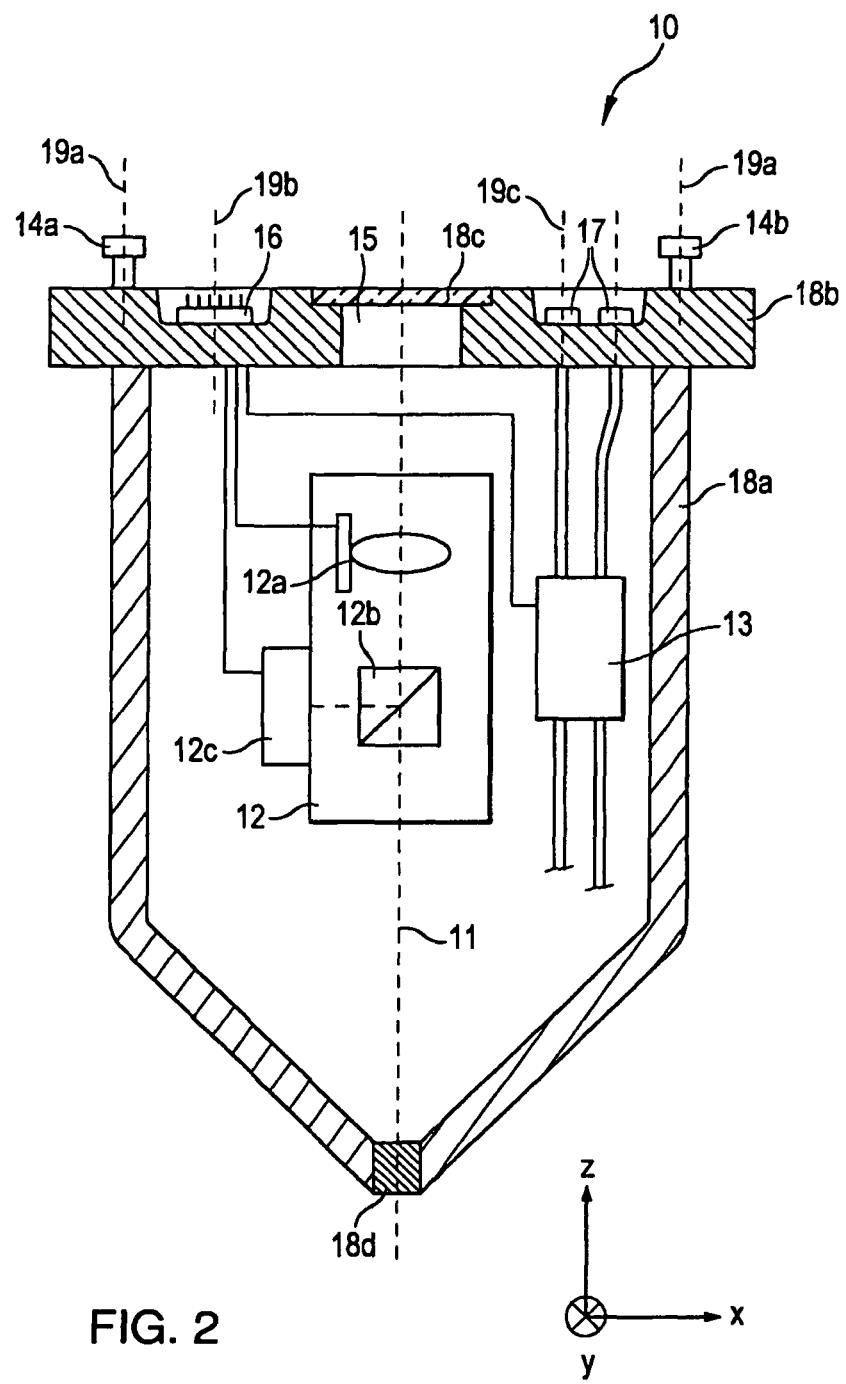
FIG. 2 schematically shows a machining head.

FIG. 2 shows a machining head 10. 11 may simultaneously denote a longitudinal axis of the machining head and the laser beam and beam path, respectively, of the laser beam. 12 refers to an optical unit which particularly comprises a focusing unit 12a that may optionally be actuated electrically, for example, possibly an optional beam splitter 12b and an optical sensor 12c. In this case, a beam guide, not shown, for beam deflection may also be provided. 13 refers to a fluid control for controlling and optionally also measuring a fluid flow.

14a and 14b denote mechanical connectors which here are drawn as mushroom-shaped pins but may of course also be formed differently, for example, as recesses. They serve the mechanically strong, rigid mechanical connection that is defined in its position between the machining head 10 and a component of the laser machining tool 1, in particular the machine connector 5 of FIG. 1.

15 denotes a light path connector which may essentially be an opening that allows the passage of laser light. Moreover, a window 18c pervious to radiation may be provided which substantially serves to protect the interior of the head from infiltrating contaminants.

16 denotes an electrical connector. It may have many individual contacts. Electrical energy (supply voltage, supply current) may be directed via the contacts, and driving signals may also be directed to the respective components inside the head and measurement and other signals may be returned from the sensors in the head. The electrical connector 16 may be a connector having the required number of contacts. This number may be comparatively high. The optical system 12 may comprise electrical connections to the electrical connector 16 in order to receive the required signals and to output the possibly obtained signals.

17 denotes one or more fluid connectors. They may be the way forward and the way back of a fluid cycle. However, it is also possible to guide a plurality of different fluids on the way forward, whose outlet is to be provided in a suitable manner. The outlet may take place, for example, through a nozzle towards the workpiece. The fluids may be controlled by the fluid control 13. The fluid control 13 may have electrical connections to the electrical connector 16 in order to receive the required signals and to output the possibly obtained signals.

18 generally denotes a housing of the machining head. It may be more or less closed. 18a, for example, is a more or less cylindrical sleeve surrounding said components of the head. 18b is a head plate positioned opposite the laser beam outlet 18d towards the workpiece. The outlet 18d in turn may be closed by a laser-pervious window. The head plate 18b and/or a further component of the head 10 may support and hold said connectors 14 to 17. The plate may essentially be positioned perpendicular to the head axis 11 and the laser beam path, respectively.

Individual ones of the connectors 14 to 17 may require a particular operational direction. This is indicated by the dashed axis 19a for the mechanical connector 14a, 14b. It is indicated by the axis 19b for the electrical connector 16. It is indicated by the axis 19c for the pneumatic connector 17. These axes 19a, 19b, and 19c corresponding to the movements for establishing the respective connection may be parallel translational movements, as shown, and may be parallel to the axis 11 of the head, as shown in FIG. 2.

What is not shown is a corresponding design of the component of the laser machining tool with which the connection is to be established, that is, on the machine connector 5. The latter is substantially designed diametrically opposed to the design of the connectors of the machining head.

Moreover, a locking device may be provided which after the rigid mechanical connection has been established locks the connected components (machining head, component of the laser machining tool) with one another such that the connection cannot unlock itself, for example, by vibrations. Accordingly, the lock has to be released before the connection is disconnected. The lock may have movable parts. They may be elastically biased and/or electrically or pneumatically operable. The locking device and in particular the movable parts thereof may be provided on the machine, especially at the machine connector 5. However, they may also be provided on the head.

In contrast to what has been described before, the relative movement for establishing the connection via the inventively designed connectors may also have a rotational movement and/or a combination of translational and rotational movements. If a plurality of movements is provided, one of them may rather serve the connectors' mechanically approaching one another while the other serves to actually establish the connections (mechanical, electrical, light, fluid) via the connectors involved.

The relative movement and possible previous starting movements may automatically be performed by the machine by using one or more of the axles 4 thereof by controlling the machine controller. The reception, deposition and change of a machining head 10 may then be part of a major machining program for machining a workpiece.

In a simple embodiment, a machining head 10 according to the invention may merely be equipped with a mechanical connector 14 and the light path connector 15. Then, the laser beam will be guided via the machining head along the axis 11 in particular towards the workpiece 9, where the beam will perform the desired machining. The establishment and the disconnection of the connection may be made via the uniform common relative movement of all head components, as described. As mentioned before, establishing the optical connection may be relatively easy insofar as only the head needs to be aligned. This may take place while the mechanical connection is established. Otherwise, the light path connection for the laser beam substantially has the passage 15 and optionally the window 18c which may be positioned opposite to corresponding openings and windows on the side of the machine connector.

In a more complex embodiment, an electrical connector 16 may be provided in addition to the mechanical connector 14 and the light path connector 15. The connection via the electrical connector 16 is established at the same time as the mechanical connection and particularly by means of the same movement (in FIG. 2 along the shown axes 19a and 19b). The connector 16 finds a diametrically opposed connector on the side of the component of the laser machining tool into which it is pushed by the connecting relative movement in order to thus establish the electrical connections. The electrical connections may be connections for transmitting energy and/or transmitting signals. Signals may run to components in the machining head (driving signals) or may run from components in the machining head to the connector 16 (measuring signals). Driving signals for driving a beam focusing unit 12a, sensor signals of an optical sensor 12c and driving and measuring signals from the fluid control 13 may be transmitted. Further driving signals and measuring signals, not shown, may also be transmitted.

In another embodiment a head may merely have a mechanical connector and an electrical connector. This may, for example, be a measuring head that mechanically travels a workpiece in order to obtain the dimensions and measurements thereof. The measuring head may work in a tactile (scanning head) or capacitive or inductive or optical manner. Then, the light path connector and the fluid connector may be omitted, or the design is such that the connectors provided on the machine for establishing the mechanical connection via the mechanical connector 14 and the electrical connection via the electrical connector 16 do not interfere.

In another embodiment all connectors (mechanical, optical, electrical and fluid) shown in FIG. 2 may be provided. However, if not required, the electrical connector 16 may optionally also be omitted.

As far as a machining head uses laser light, it may be a drilling head or a cutting head or a welding head. In the present case, the respective currently desired machining site on the workpiece is approached here by moving the head 10 as a whole. The laser light may move through the head on a fixedly defined light path. However, the machining head may also be a scanning head and have a scanning unit, for example in the shape of one or more drivable and adjustable swiveling mirrors positioned at an angle relative to one another. Thus the light path may be changed in the head so that the approach of the respective currently desired machining site on the workpiece 9 may be performed by the scanning unit such that the head as a whole may be stationary. The scanning unit can deflect the beam one-dimensionally or two-dimensionally. It may be fast and travel a track on the workpiece within less than 100 ms or less than 10 ms. Control may be performed according to signals from the electrical connector 16. An automatic control may be provided in the head 10. Scanning signals may also be taken back to the electrical connector 16.

Figure 4:
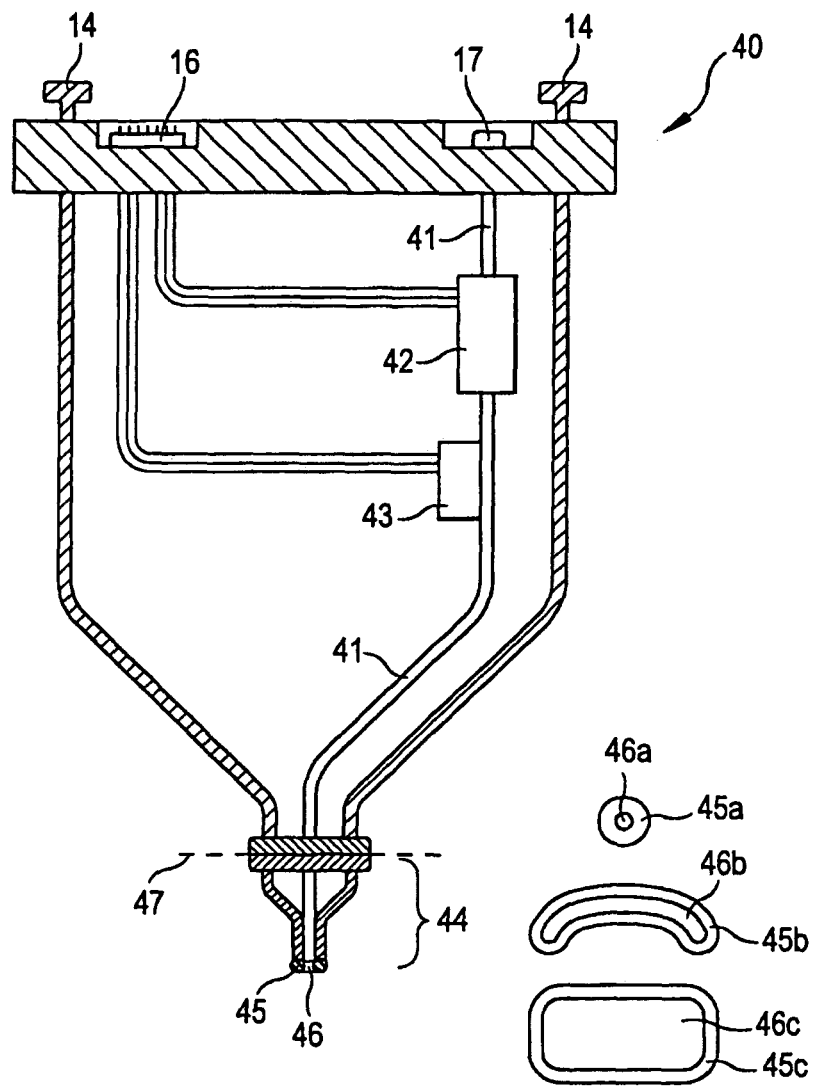
FIG. 4 shows a machining head.

In another embodiment, the machining head may merely have a fluid connector 17, apart from the mechanical connector 14. As shown in FIG. 4, a measuring head 40 may be built e.g. for measuring purposes. The measuring head may then have a defined fluid outlet that can be pressed onto a workpiece 9. Thus, it is possible to generate a fluid flow through an opening produced in a workpiece 9 which flow can be measured according to pressure and/or to flow in order to measure, for example, the cross-section of a created bore. Often, bores may be too narrow to be scanned via e.g. a measuring scanner. A flow measurement by using a forced-through fluid will then allow conclusions on the passability and optionally on the diameter of the created bore.

In this embodiment the fluid outlet towards the workpiece may have a mouth 46 comprising a circumferential elastic sealing member 45, in particular an elastic ring around the outlet opening in order to create a gas-tight connection with the channel manufactured in the workpiece 9 by selectively pressing the fluid outlet opening onto the workpiece surface. The mouth 46 and the sealing member 45 may be formed specifically for the workpiece and adapted to the workpiece surface—which possibly is not plane. It may be comparatively small and merely cover a bore. However, it may also be larger and then cover several bores. The mouth may be formed by a mouthpiece 44 at the head 40. It may be automatically exchangeable at an interface 47. Then, a plurality of mouthpieces having differently shaped mouth openings may be provided in a magazine, as schematically shown by 46a and a corresponding sealing 45a for individual openings or small areas, by 46b and corresponding sealings 45b for a curved line of openings, or by 46c and a corresponding sealing 45c for a larger area covered by openings. The operation may be carried out by using negative pressure instead of high pressure.

This aspect is regarded as an independent aspect of the disclosed embodiments. It may be used together with the design of the head connectors as described above, but also independently thereof. Thus, a corresponding machining head would represent a measuring head that can also be connected in a conventional manner to a machining system (for example, manual manufacture of the mechanical connection and the fluid connection). Here, the measurements of the fluid pressure and/or fluid flow can be taken. They can be performed outside of the machining head 10 because they make themselves known via the conduit 8 away from the machining head. Then, a flow resistance can be evaluated as a quotient of pressure and flow (similar to Ohm's Law (R=U/I)). The resulting value allows conclusions as to the passability and the diameter or minimum cross-sectional area of a previously made bore. Optionally, finishing may be carried out or process parameters can be changed for the further course. To a certain scope, it is possible in this embodiment to also take measurements within the machining head, for example, a flow measurement and/or a pressure measurement. Then, electrical signals will be generated in the machining head that have to be dissipated via an electrical connector to be provided in this case. As mentioned before, the described features of the use of fluid for measurement purposes may be used independently of the described design of the connectors of the machining head but also together with these designs. The fluid may be pressurized air.

However, a measuring head as above may also be combined with the described machining head units (light path, electrical connectors). The fluid outlet may be adjacent to the laser light outlet. They may also have a common outlet, such as when the head housing as a whole is used as a fluid conduit or when the laser light passes through a window into the fluid channel and then passes to the outside in the latter.

The laser machining tool 1 according to the invention has a machine connector 5 for a machining head 10 that is designed to be fitting in a diametrically opposed manner to the connectors 14-17 of the machining head 10 itself. It includes the accordingly required connectors. As far as no changes to the arm components are possible or desired on the machine, the machine connector 5 may accordingly have all diametrically opposed individual connectors (mechanical, laser, electrical, fluid) which, depending on the demand, are used by the respectively mounted machining head or left open, as is shown with reference to the embodiments of the machining head described further above.

Figure 1:
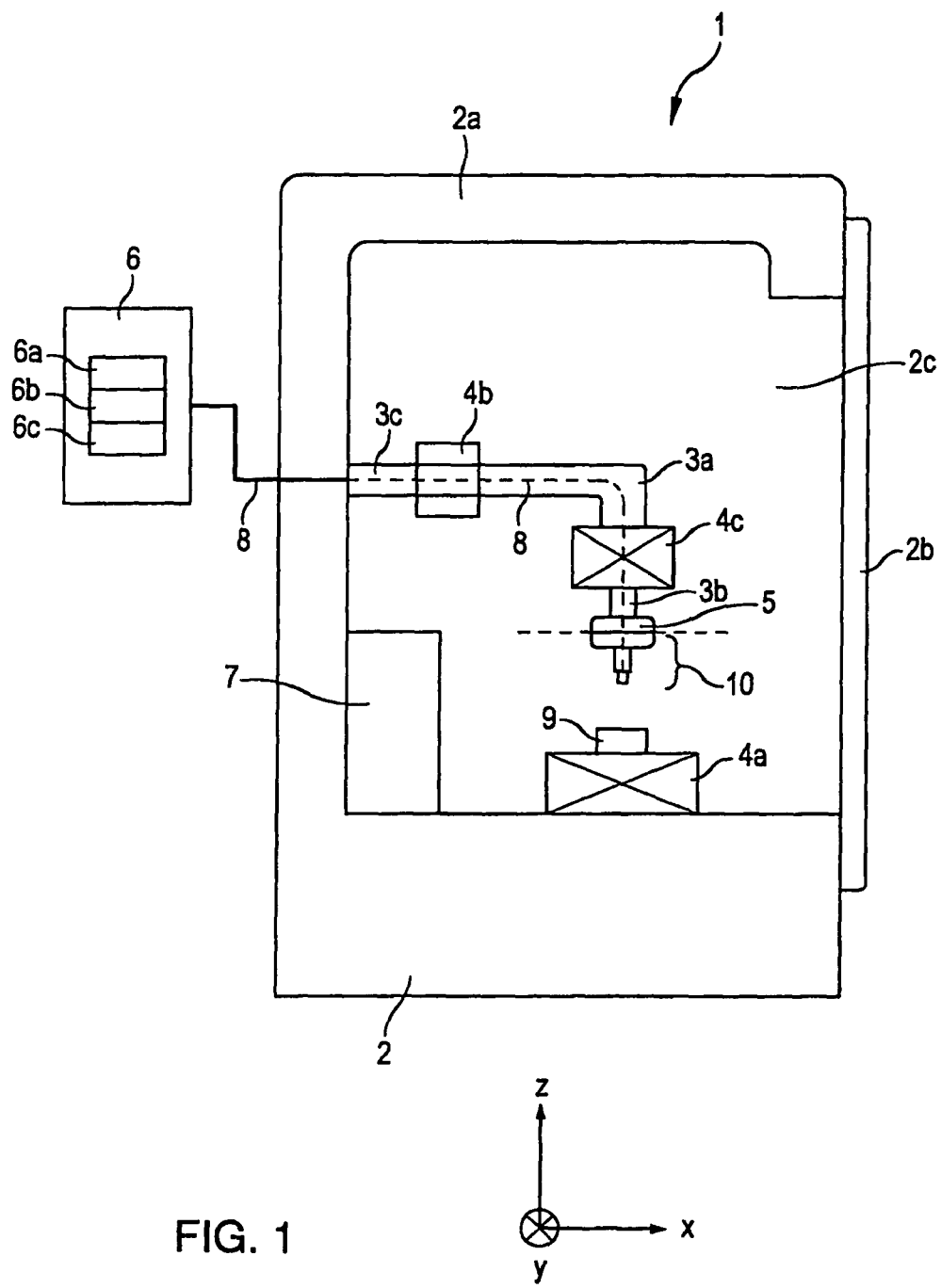
FIG. 1 schematically shows a laser machining tool.
Figure 3A:
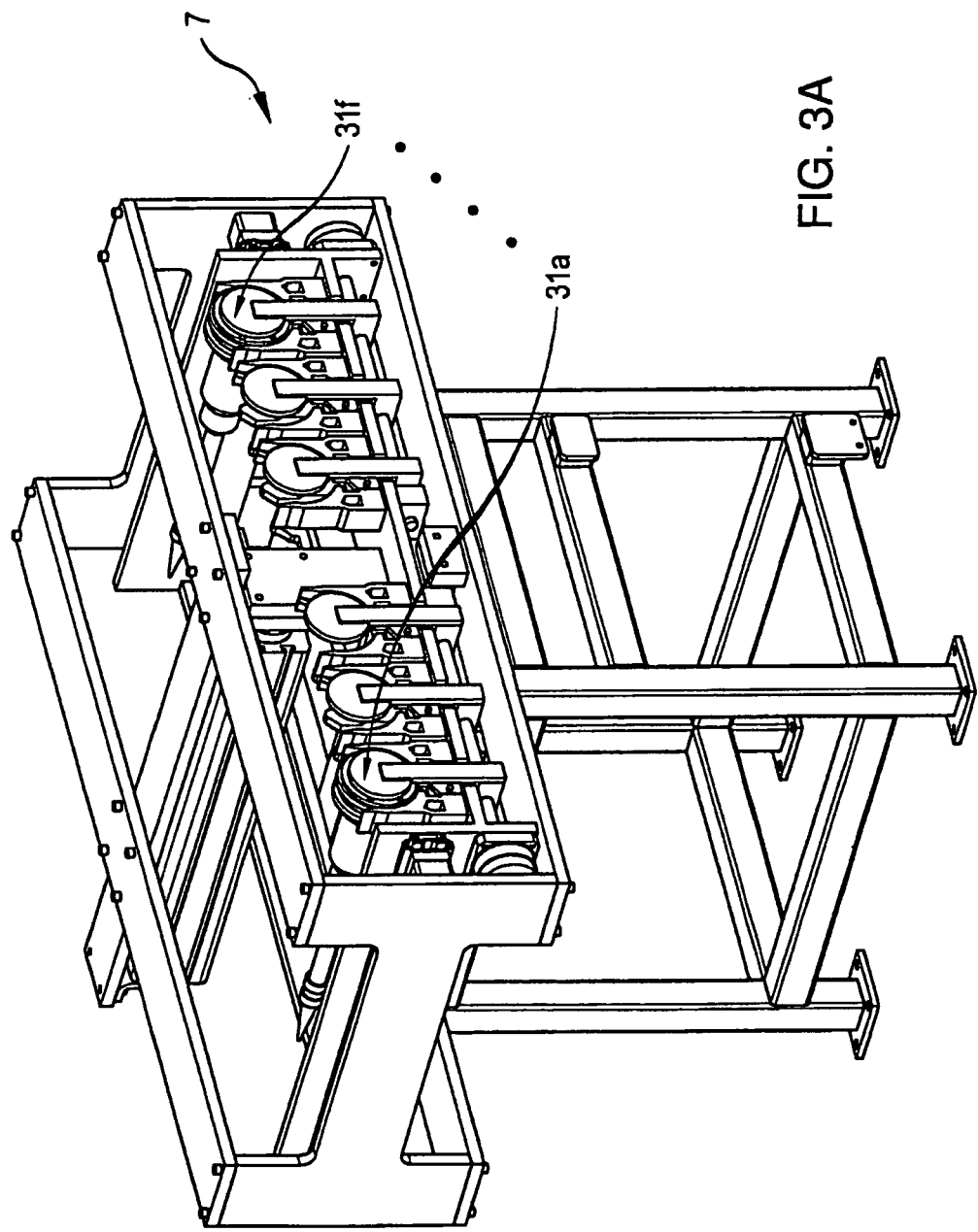
FIGS. 3A-D schematically show a machining head magazine.

As schematically shown in FIG. 1, the laser machining tool 1 may have a magazine 7 for a plurality of machining and measuring heads 10a, 10b. The magazine 7 may be located in the interior 2c of the machining tool 1. As shown in FIG. 3A, it may accommodate a plurality of bearing positions 31a to 31f that respectively are able to receive a machining head 10. The magazine 7 may be accessible for the arm of the laser machining tool in a manner that it can be approached by the arm, the arm then being able to also perform the relative movement necessary for establishing the connection. In one embodiment, when the connection between the machining head 10 and the machine connector 5 is established or disconnected, the machining head 10 stands still while the machine connector moves along or about one of the axles 4 thereof. However, it may also be the other way round, or both parts may move.

Figure 3B:
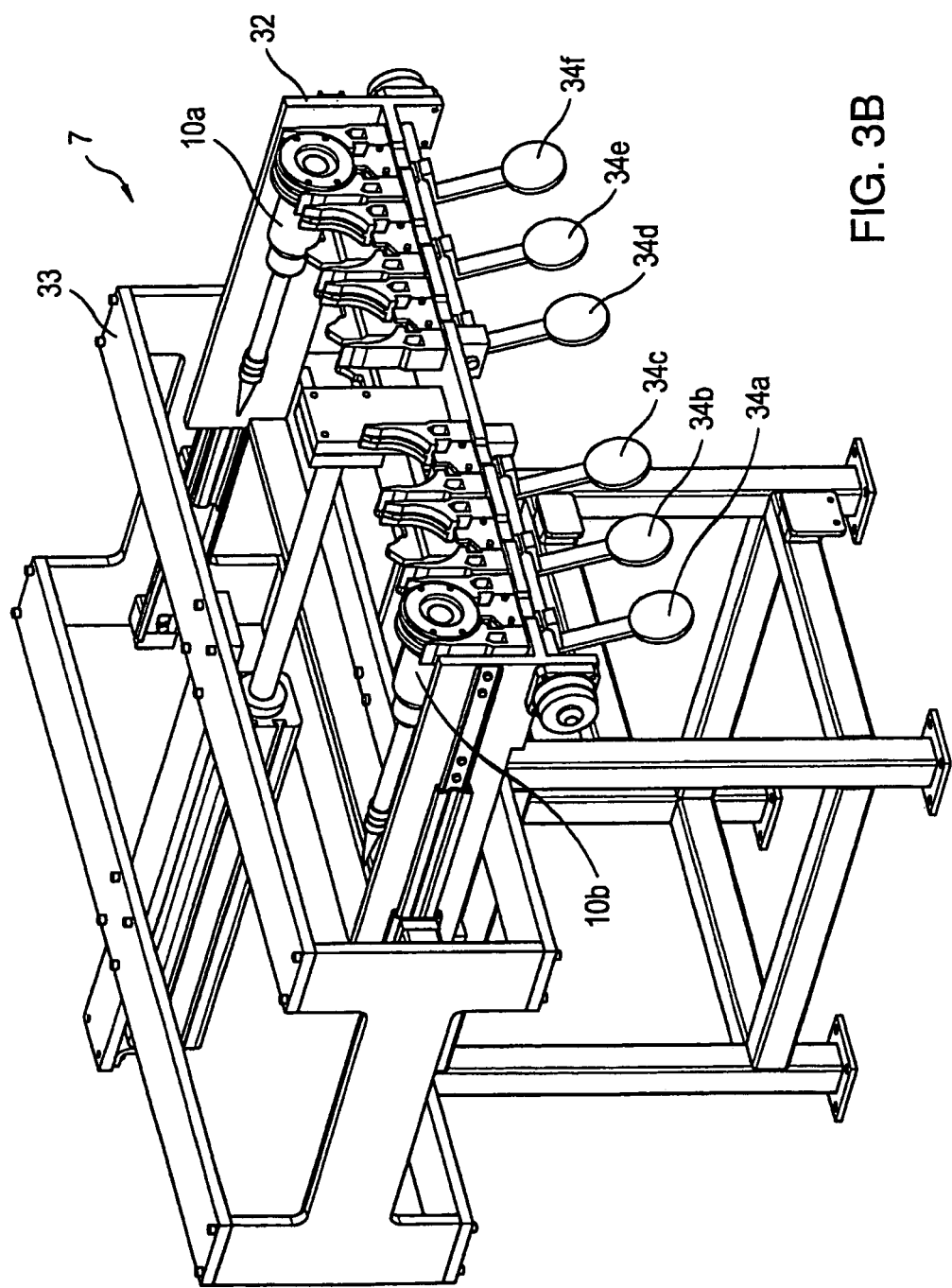

In the embodiment as shown, the machining heads are arranged next to one another in the magazine. However, the arrangement may also be vertical. As shown in FIG. 3B, the magazine may include a magazine frame 33 and a drawer insert 32, the drawer insert 32 being retractable into the magazine frame or extendable from the same. The drive may be electric or pneumatic. The drawer insert 32 carries the actual accommodation positions 31a to 31f for the various machining heads 10. When a head is changed, the drawer 32 is extended, as shown in FIG. 3B while otherwise it is retracted.

Furthermore, flaps 34a-f may be provided that cover or close the individual machining heads 10 and in particular the connecting portions thereof so that they are not contaminated. The flaps 34 may be positioned above the connecting portions of the machining heads when the magazine is currently not needed or operated. As shown in FIG. 3B, the flaps may be opened or flipped open when a machining head is to be changed. The flaps may be individually or commonly operable. The flaps and the drawer may be operated automatically by controlling the general machine control.

Figure 3C:
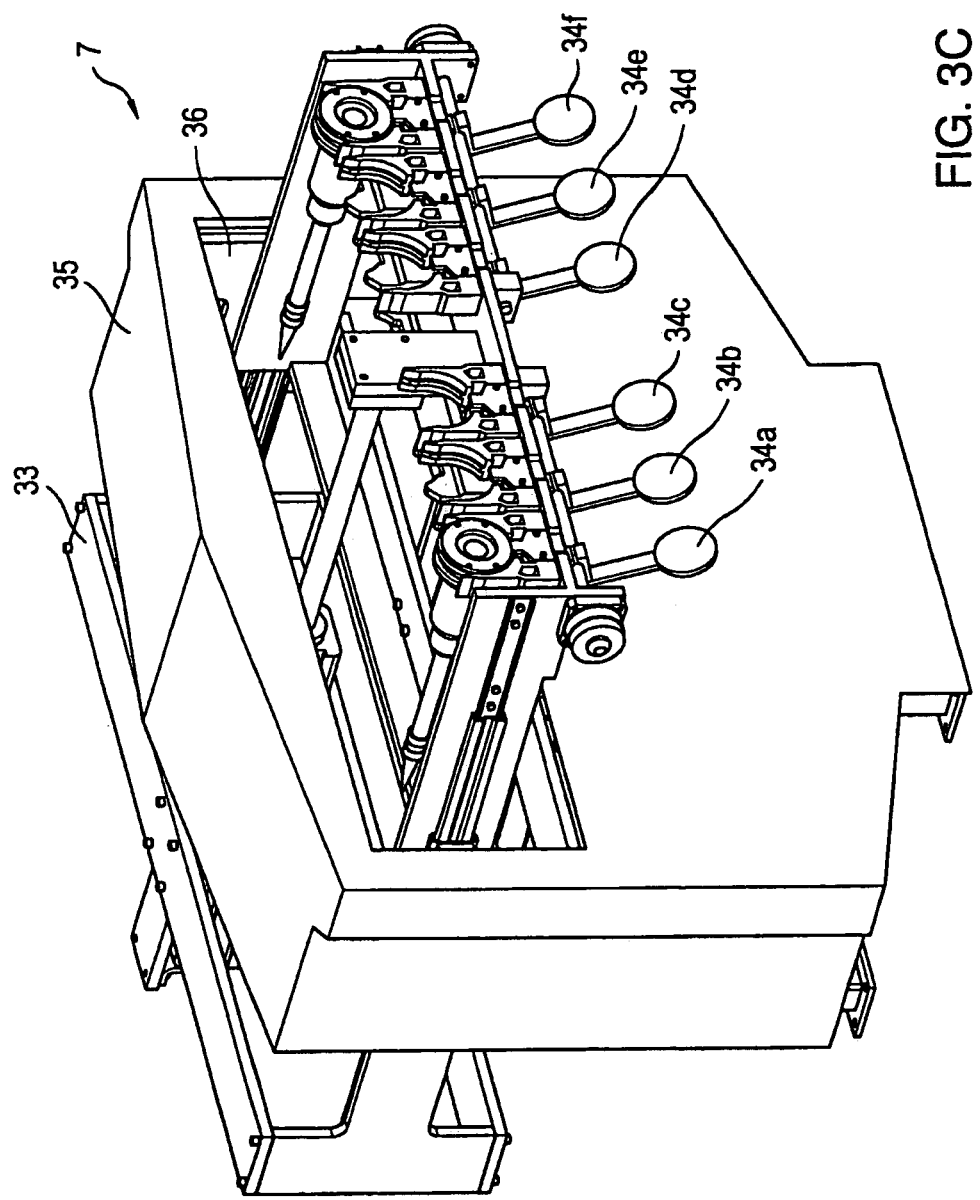
Figure 3D:
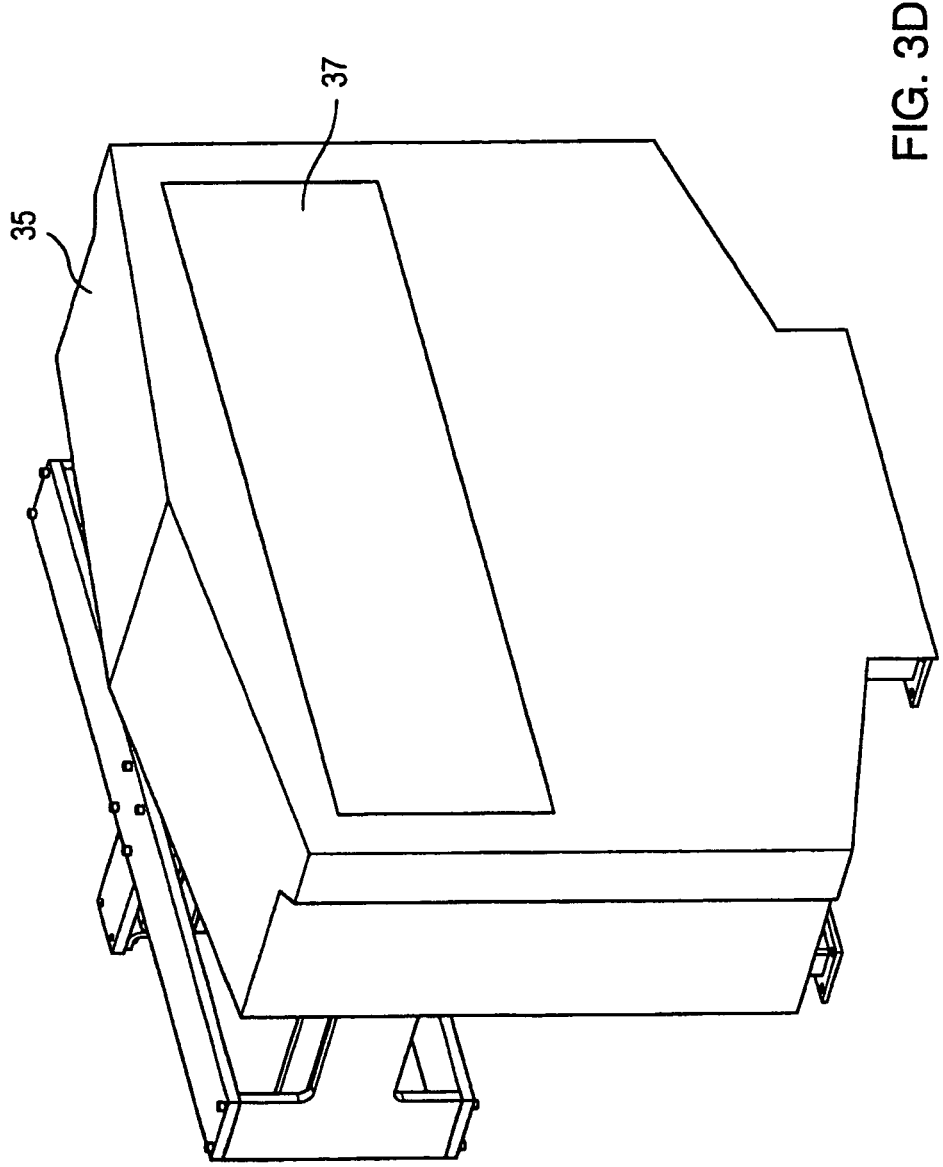

Moreover, according to FIG. 3C, a hood 35 may be provided that surrounds the magazine and has an opening 36 through which a machining head 10 may pass, for example, by extending the drawer 32 through the opening 36, as shown in FIG. 3C. The opening 36 of the hood 35 in turn may have another flap 37 that closes the opening 36 (FIG. 3D) when the magazine 7 is not needed. The flap 37 may be co-operated mechanically, for example, by extending the drawer 32, or it can be controlled independently. The hood 35 may completely envelope the magazine 7 so that contaminants and process materials that may be generated during the laser machining of a workpiece do not reach the machining heads.

Other fluid measuring methods may be designed as follows:

In a portion of the machine that can be accessed by the machining head, a sample workpiece is kept in place in a fixedly clamped manner, for example, a plate of a defined thickness. One or more openings (through holes) are manufactured in the sample workpiece by means of a machining head. As described above, said openings are inspected with fluid qualitatively for passability and optionally also quantitatively for the cross-section. Depending on the result of the inspection, a machining procedure may be influenced. For example, process parameters (e.g. laser performance, position control) may be adjusted or changed or a manual intervention may be required. The work and measurement on the sample workpiece may be carried out on the actual workpiece before the work is begun or alternatively therewith.

The above inspection may be performed by using a measuring head, as described above, or by using an own stationary fluid measuring unit that works as described above (flow measurement, pressure measurement, optionally quotient formation, evaluation) which, however, is fixedly provided on the sample workpiece. For example, the sample workpiece may be clamped in front of a pressurized air outlet.

Finally, it is also possible to directly connect a workpiece provided with through holes in a clamped condition to a pressurized fluid source (e.g. a pressurized air source), then to produce the through hole(s) in the workpiece and to follow and particularly evaluate the resulting fluid parameters— once or several times. Some turbine blades have e.g. an inside larger channel that has fine branching channels for cooling fluid towards the blade surface. The large channel may be pressurized by air. When by and by the branching channels are manufactured by laser drilling, it is possible to track and evaluate or inspect the pressure and the flow. Depending on the examination result, the operation procedure may be influenced as described above. The machining can be done in a similar manner if the rear side of the machining surface of the workpiece is accessible instead of a channel.

Figure 5:
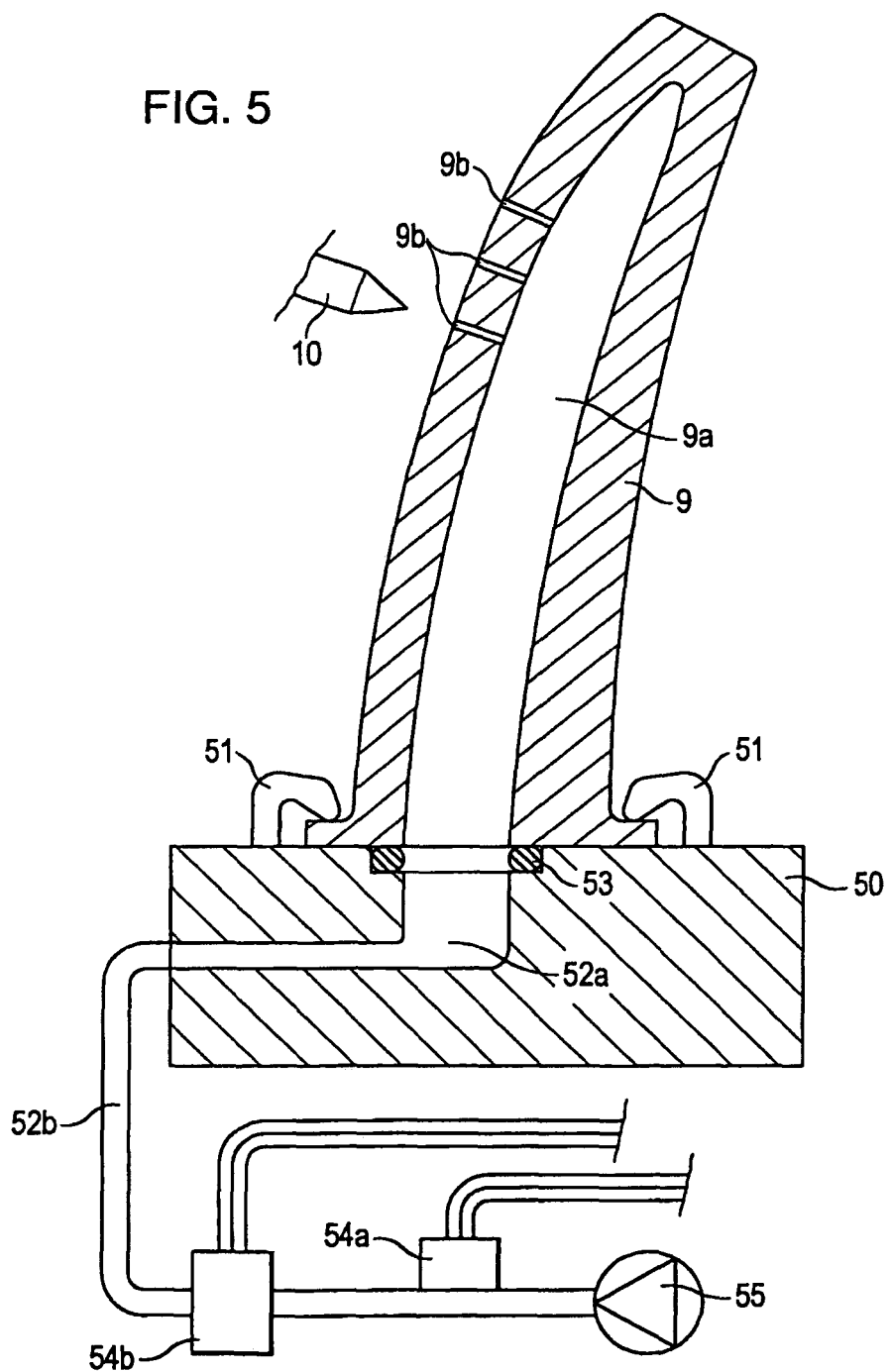
FIG. 5 shows a measuring system.

To illustrate this, FIG. 5 shows an embodiment of a workpiece holder 50 to which the workpiece 9 may be solidly clamped, for example, via claws 51. The workpiece holder 50 may be directly the workpiece table of the machine or an intermediate piece that can be clamped to the workpiece table. The workpiece holder 50 has a fluid supply 52a and an elastic sealing member 53. 52b symbolizes a fluid conduit, 54a and 54b symbolize sensors, for example, for fluid pressure and fluid flow. 55 denotes a fluid source (high pressure or negative pressure). 10 symbolizes a laser drilling head that manufactures e.g. bores 9b from the top to the bottom, which bores communicate with a channel 9a in the center. Under constant conditions at the fluid source, the fluid flow will increase and the fluid flow decrease with each added bore 9b. These values and/or derived values (e.g. quotient) can be compared to target values. If necessary, the process may be influenced or modified or stopped. The workpiece holder including the pressurized air supply is considered to be an independent part of the invention.

The invention claimed is:

1. A measuring head of a machine tool comprising:
   a support supporting a mechanical connector for connecting the measuring head to a component of the machine tool and a fluid connector for connecting the measuring head to a measurement fluid source, and
   a fluid outlet configured to be pressed onto a workpiece,
   wherein a common relative movement between the support, the mechanical connector and the fluid connector of the measuring head relative to the component of the machine tool is used to form a mechanically rigid connection between the mechanical connector on the support of the measuring head and a corresponding mechanical connector on the component of the machine tool and a fluid connection between the fluid connector on the support of the measuring head and a corresponding fluid connector of the fluid source.

2. The measuring head according to claim 1, further comprising at least one or more of a fluid pressure measuring device and a fluid flow measuring device.

3. The measuring head according to claim 1, wherein the fluid outlet comprises a sealing member, in particular an elastic ring around the outlet opening for establishing a gastight connection to the workpiece surface.

4. The measuring head according to claim 1, the support further comprising:
one or more of the following connectors:
a light path connector; and
an electrical connector;
wherein one or more common relative movements between the support of the measuring head and the components of the machine tool are used to form mechanically rigid connections for at least one of light, fluid or electrical conduits between the light path connector and the electrical connector to corresponding connectors on the component of the machine tool.

5. A measuring method for measuring an opening produced in a workpiece, comprising:
effecting a fluid flow through the opening by mounting a measuring head to a machine tool, the measuring head comprising:
a support supporting a mechanical connector for connecting the measuring head to a component of the machine tool and a fluid connector for connecting the measuring head to a fluid source, and
a fluid outlet configured to be pressed onto the workpiece,
using one or more common relative movements between the support, the mechanical connector and the fluid connector of the measuring head and the component of the machine tool to form a mechanically rigid connection between the mechanical connector on the support of the measuring head and a corresponding mechanical connector on the component of the machine tool and a fluid connection between the fluid connector on the support of the measuring head and a corresponding fluid connector of the fluid source,
pressing the measuring head on to the workpiece,
effecting the fluid flow,
measuring at least one of the fluid flow or fluid pressure, and
evaluating the measuring results.

6. The method of claim 5, wherein the opening is machined in a pressurized sample workpiece and the machining of the actual workpiece is configured to be influenced in accordance with the evaluation result.

7. The method of claim 5, further comprising:
applying a pressurized fluid to the actual workpiece,
obtaining and evaluating one or more fluid parameters depending on the machining progress, and
influencing the machining of the workpiece can in accordance with the evaluation result.

8. The method of claim 5, wherein the measuring head further comprises at least one of a fluid pressure measuring device or a fluid flow measuring device.

9. The method of claim 5, wherein the fluid outlet of the measuring head comprises a sealing member, in particular an elastic ring around the outlet opening for establishing a gastight connection to the workpiece surface.

10. The method of claim 5, wherein the support of the measuring head further comprises:
one or more of a light path connector and an electrical connector; and
wherein the method comprises using one or more common relative movements between the support of the measuring head and the component of the machine tool to form mechanically rigid connections and connections for at least one of light, fluid or electrical conduits between the light path connector and the electrical connector to corresponding connectors on the component of the machine tool.

* * * * *